United States Patent [19]
Kwon et al.

[11] Patent Number: 5,887,078
[45] Date of Patent: Mar. 23, 1999

[54] APPARATUS AND METHOD FOR CLASSIFYING AND RECOGNIZING IMAGE PATTERNS USING NEURAL NETWORK

[75] Inventors: Hee Yong Kwon, Kyoungki-do; Dae Hwan Kim, Seoul; Byeong Cheol Kim, Kyoungki-do; Hee Yeung Hwang, Choongcheongnam-do; Dong Sub Cho, Seoul; Heung Ho Lee, Taejon-Si, all of Rep. of Korea

[73] Assignee: Korea Telecommunication Authority, Seoul, Rep. of Korea

[21] Appl. No.: 659,739

[22] Filed: Jun. 6, 1996

Related U.S. Application Data

[63] Continuation-in-part of Ser. No. 282,953, Jul. 29, 1994, abandoned.

[30] Foreign Application Priority Data

Dec. 29, 1993 [KR] Rep. of Korea .................. 1993-30983

[51] Int. Cl.$^6$ .................................................. G06K 9/62
[52] U.S. Cl. ............................................ 382/156; 382/293
[58] Field of Search ..................... 382/293, 295, 382/296, 298, 155, 124, 276, 156, 302

[56] References Cited

U.S. PATENT DOCUMENTS

| | | | |
|---|---|---|---|
| 5,063,604 | 11/1991 | Weiman | 382/170 |
| 5,287,272 | 2/1994 | Rutenberg et al. | 382/224 |
| 5,351,311 | 9/1994 | Rogers et al. | 382/156 |
| 5,388,164 | 2/1995 | Yonekawa et al. | 382/134 |

*Primary Examiner*—Phuoc Tran
*Attorney, Agent, or Firm*—VENABLE; Robert J. Frank; Michael A. Sartori

[57] ABSTRACT

The present invention provides an apparatus and a method for classifying and recognizing image patterns using a second-order neural network, thereby achieving high-rate parallel processing while lowering the complexity. The second-order neural network, which is made of adders and multipliers, corrects positional translations generated in a complex-log mapping unit to output the same result for the same object irrespective of the scale and/or rotation of the object. The present invention enables high-rate image pattern classification and recognition based on parallel processing, which is the advantage obtained in neural network models, because consistent neural networks and consistent network structure computation models are applied to all steps from the image input step to the pattern classifying and recognizing step.

11 Claims, 9 Drawing Sheets

OUTPUTS FROM FIG. 4A
OR FIG. 5A

APPARATUS AND METHOD FOR CLASSIFYING AND RECOGNIZING IMAGE PATTERNS USING NEURAL NETWORK

This application is a continuation-in-part of application Ser. No. 08/282,953 filed Jul. 29, 1994, now abandoned.

BACKGROUND OF THE INVENTION

1. Field of the Invention

The present invention relates to image pattern classification and recognition, and more particularly to an apparatus and a method for classifying and recognizing image patterns, irrespective of scale and rotation transformation, using an image input unit for transforming an image of an object into a rotation and scale invariant form and using an artificial neural network.

2. Description of the Prior Art

Recently, an increased demand for automated and manless systems in factories has resulted in a strong need for an apparatus for classifying and recognizing image data. In particular, when an object or an image input unit used is translated, an image of the object input in the image input unit is transformed in scale and rotation. In this case, accordingly, a transform invariant recognition is needed. In this regard, there have been proposed devices for transforming images involving various transformations in scale and rotation into a certain invariant form, and thereby recognizing the result.

Referring to FIG. 1, illustrated is an example of a conventional case as mentioned above. As shown in FIG. 1, the conventional apparatus includes a complex-log mapping unit 11, a Fourier transform unit 13 and a multilayer perceptron unit 15. In this case, an input image is transformed into a scale and rotation invariant image using the scale and rotation invariance of complex-log mapping. A Fourier transform is also carried out to correct possible positional translation of an output of complex-log mapping. The transformed result is classified and recognized by a neural network. The conception of the complex-log mapping unit is described in "Form-Invariant, Topological Mapping Strategy for 2D shape Recognition", by L. Massone et al., reference being made to a "retino-cortical mapping".

However, this conventional case involves an additional computation for achieving the Fourier transform. As a result, it has the disadvantages of a very difficult parallel processing and a high network complexity.

SUMMARY OF THE INVENTION

Therefore, an object of the present invention is to solve the above-mentioned problems encountered in the prior art and, thus, to provide an apparatus and a method for classifying and recognizing image patterns using a second-order neural network, capable of eliminating the Fourier transformation, and thereby achieving high-rate parallel processing while lowering the complexity.

In accordance with one aspect of the present invention, there is provided an apparatus for classifying and recognizing an image received from an object, by converting the image received from the object into an image pattern, irrespective of the scale and/or rotation variation of the image, the apparatus comprising: a complex-log mapping means, having optical input elements arranged in a polar exponential manner, for mapping the image received from the object into an orthogonal coordinate system, wherein the complex-log mapping means outputs the same result for the same object irrespective of the scale and/or rotation of the object; a second-order neural network means for multiplying the output result of the complex-log mapping means and for adding the results of the multiplication to produce an output which is the same for the same-shaped object irrespective of the positional translation; and a classifying and recognizing neural network means, having a neural network, for classifying and recognizing the output of the second-order neural network means, whereby the output result of the complex-log mapping means is processed in parallel in the orthogonal coordinate system.

In accordance with another aspect of the present invention, there is provided an apparatus for classifying and recognizing an image received from an object, by converting the image received from the object into an image pattern, irrespective of the scale and/or rotation variation of the image, the apparatus comprising: complex-log mapping means, having optical input elements arranged in a polar exponential manner, for mapping the image received from the object into an orthogonal coordinate system, wherein the complex-log mapping means outputs the same result for the same object irrespective of the scale and/or rotation of the object; second-order neural network means for multiplying and adding the output result of the complex-log mapping means, to produce an output which is the same for the same-shaped object irrespective of a positional translation; and a classifying and recognizing neural network means, having a neural network, for classifying and recognizing the output of the second-order neural network means, whereby the output result of the complex-log mapping means is processed in parallel in the orthogonal coordinate system.

In accordance with still another aspect of the present invention, there is provided a method for classifying and recognizing an image received from an object through optical input elements which are disposed in a polar exponential arrangement, by converting the image received from the object into an image pattern, irrespective of the scale and/or rotation variation of the image, the method comprising the steps of: (a) outputting the same image pattern for the image of the object through the optical input elements irrespective of the scale and/or rotation variation of the image of the object; (b) multiplying outputs from the optical input elements; (c) adding the results of the multiplication in step (b) and outputting the same results, irrespective of the position variation of the image of the object; and (d) classifying and recognizing results generated in step (c).

In accordance with yet another aspect of the present invention, there is provided a method for classifying and recognizing an image received from an object through optical input elements which are disposed in a polar exponential arrangements, by converting the image received from the object into an image pattern, irrespective of the scale and/or rotation variation of the image, the method comprising the steps of: (a) outputting the same image pattern for the image of the object through the optical input elements irrespective of the scale and/or rotation variation of the image of the object; (b) horizontally or vertically multiplying and adding the outputs from the optical input elements using a second-order neural network, to extract positional translation invariant features from output results generated at step (a), irrespective of the position variation of the image of the object; and (c) classifying and recognizing the extracted results generated at step (b).

BRIEF DESCRIPTION OF THE DRAWINGS

Other objects and aspects of the invention will become apparent from the following description of the embodiments with reference to the accompanying drawings in which.

DETAILED DESCRIPTION OF THE PREFERRED EMBODIMENTS

Figure 1:
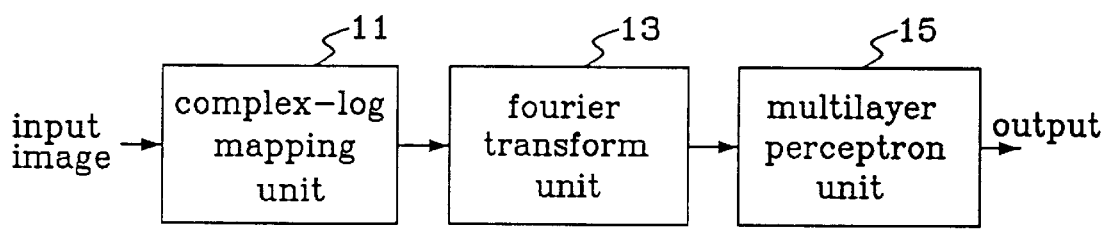
FIG. 1 is a block diagram illustrating a conventional apparatus for classifying and recognizing image pattern.
Figure 2:
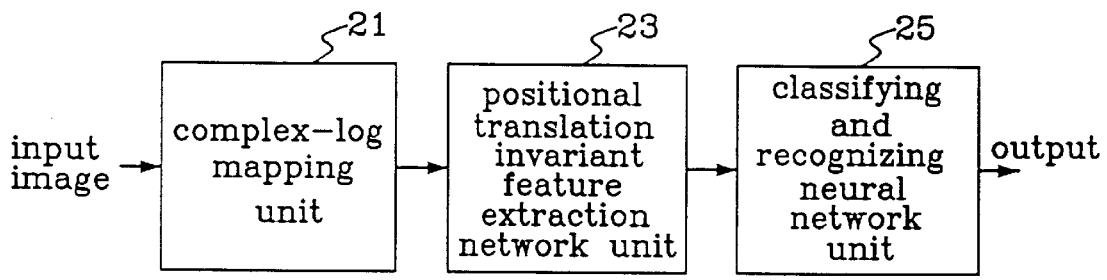
FIG. 2 is a block diagram illustrating an apparatus for classifying and recognizing an image pattern in accordance with the present invention.

FIG. 2 is a block diagram illustrating an apparatus for classifying and recognizing an image pattern in accordance with the present invention. In FIG. 2, the reference numeral 21 designates a complex-log mapping unit, 23 designates a positional translation invariant feature extraction network unit (hereinafter, referred to as a PIU), and 25, a classifying and recognizing neural network unit.

Figure 5A:
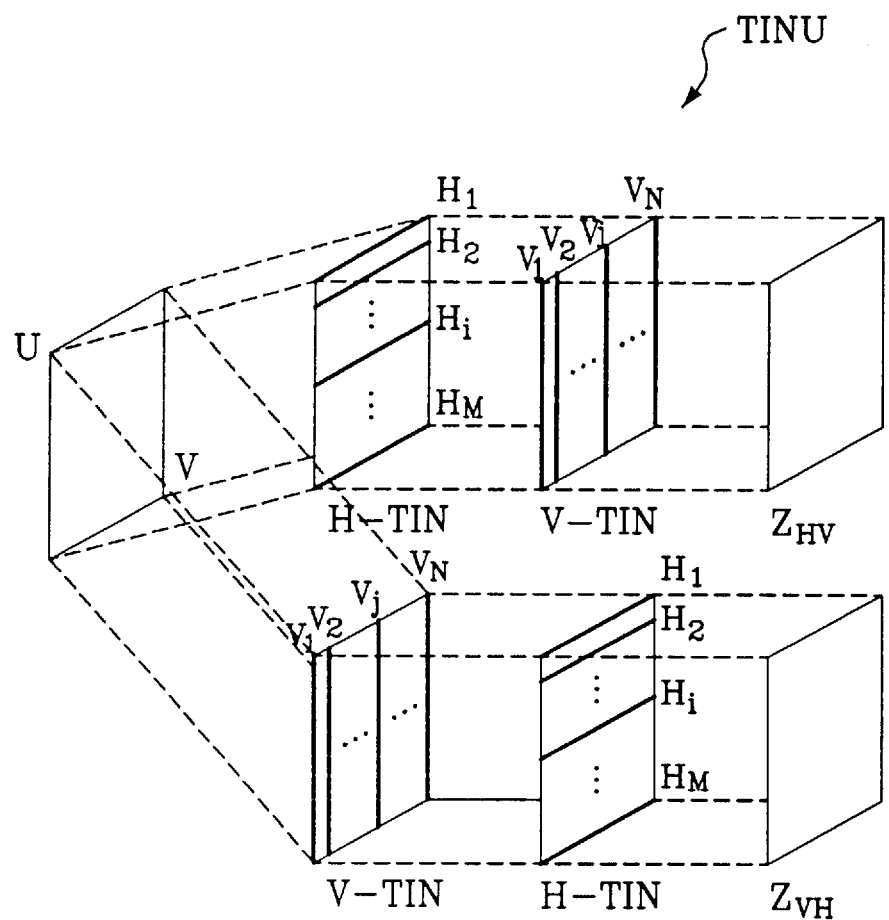
FIG. 5A is a view illustrating the second positional translation invariant feature extraction network unit (hereinafter, referred to as a TINU) using a second-order neural network in accordance with an embodiment of the present invention.
Figure 6:
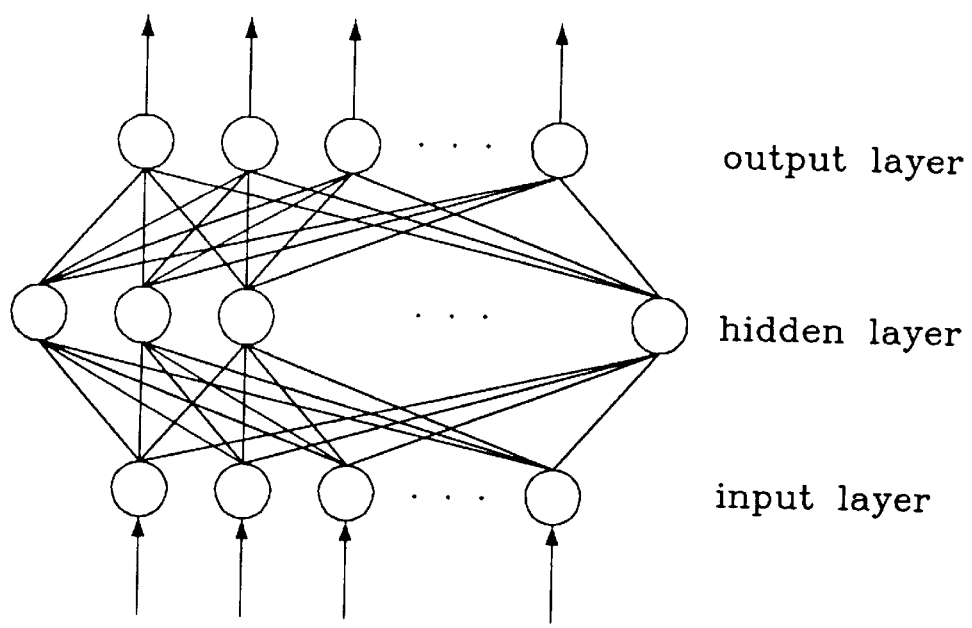
FIG. 6 is a schematic view illustrating an example of a classifying and recognizing neural network unit in accordance with the present invention.

As shown in FIG. 2, the apparatus of the present invention includes the complex-log mapping unit 21 for mapping an input image of an object, irrespective of the scale and/or rotation of the object, into a scale and/or rotation invariant image pattern, the PIU 23 for converting an output of the complex-log mapping unit 21 into a positional translation invariant form using a neural network (FIG. 4A or 5A), and the classifying and recognizing neural network unit 25 for classifying and recognizing an output of the PIU 23 using a neural network (FIG. 6).

Units 23 and 25 of the apparatus, in accordance with the present invention, are constructed using neural network structures. Since an input image signal is finally converted into the scale and/or rotation invariant form after passing through the networks, in accordance with the present invention, parallel processing for image signals at a high rate is possible. It is also possible to convert the input image into the scale and/or rotation invariant form only, by properly selecting an arrangement of optical input elements and connection of the optical input elements to neural networks. Accordingly, the conversion into the scale and/or rotation invariant form and the conversion into the positional translation invariant form can be achieved without using any mathematical conversion such as the Fourier conversion. This enables the recognition of an input image at a high rate, irrespective of scale and/or rotation variation.

Figure 3A:
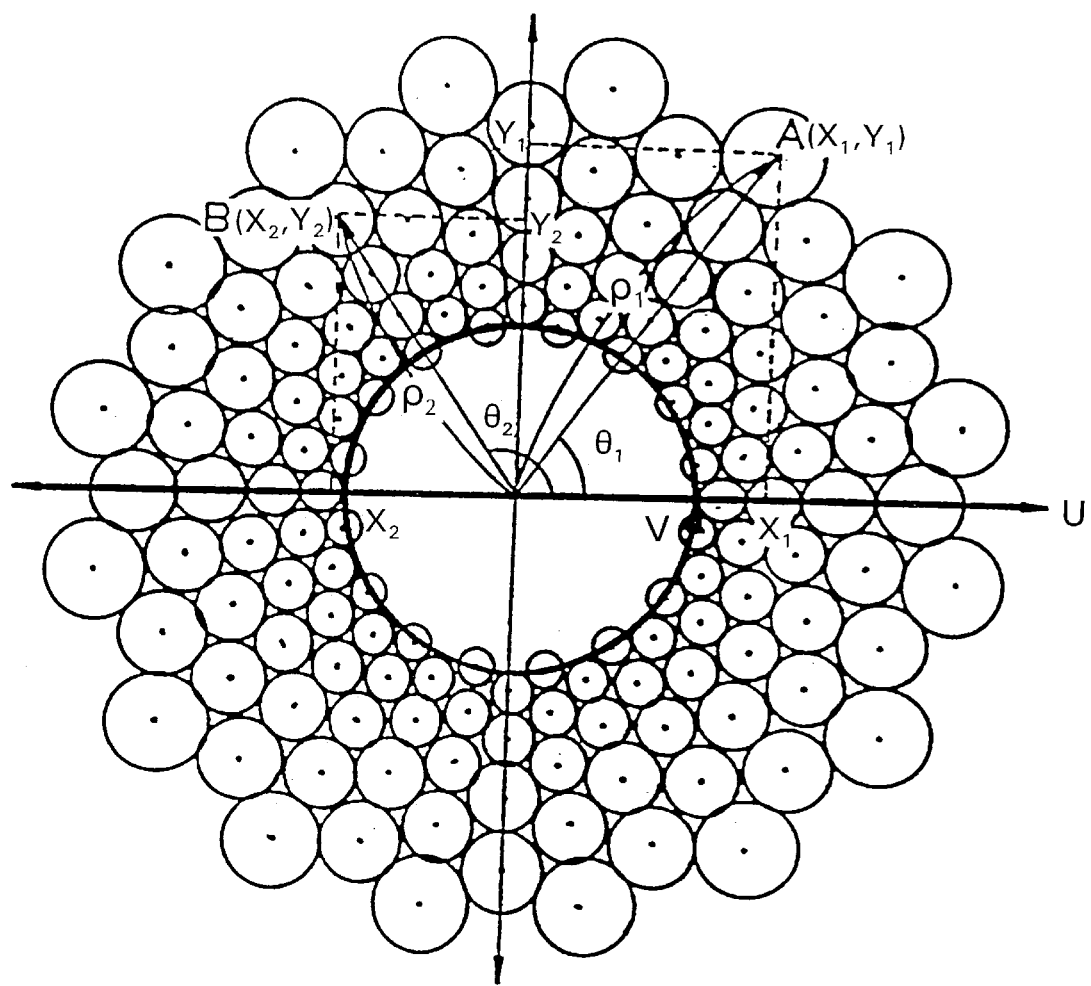
FIG. 3A is a schematic view illustrating an example of a complex-log mapping unit for performing complex-log mapping by a polar exponential sampling in accordance with the present invention.
Figure 3B:
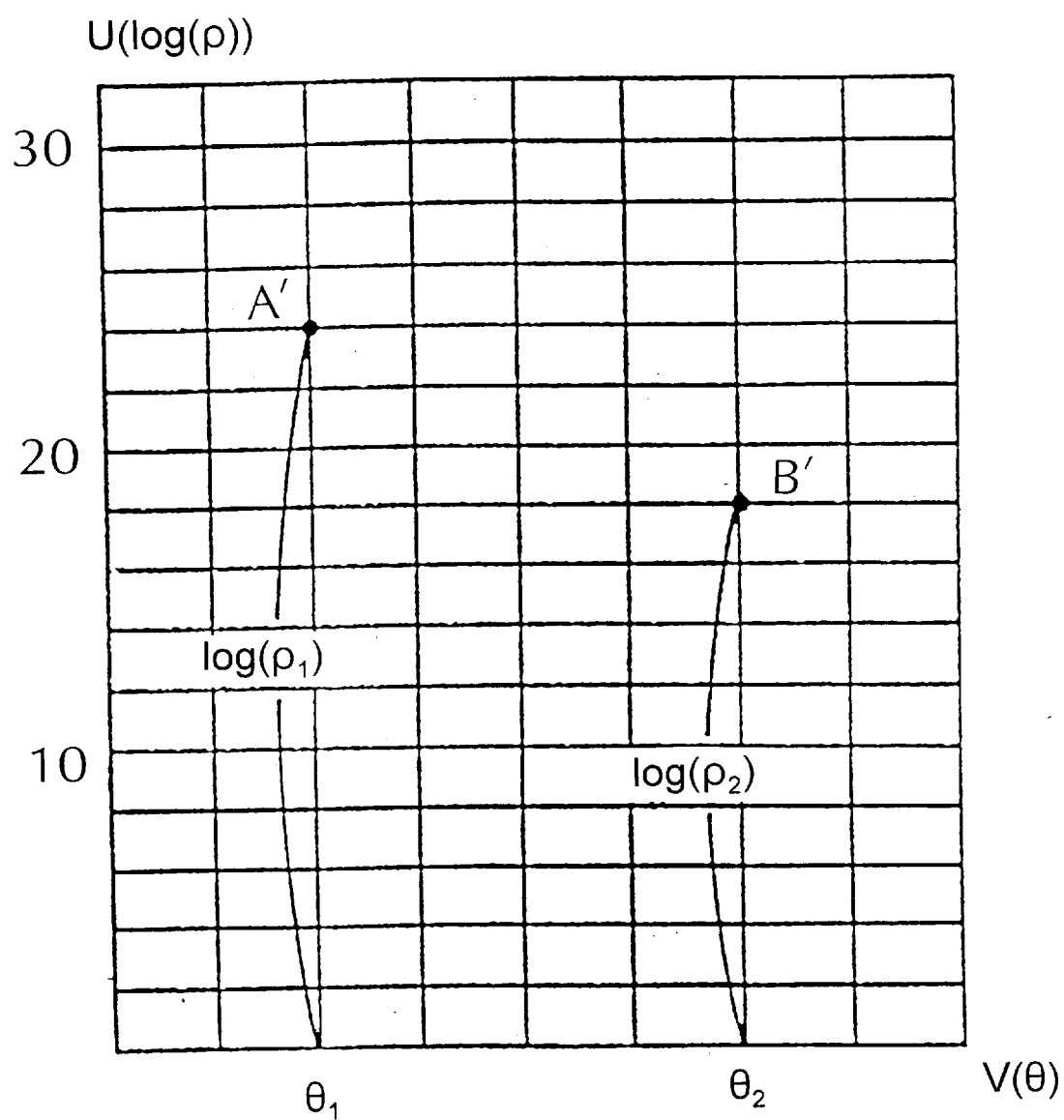
FIG. 3B is a schematic view illustrating an example of mapping results of the polar exponential sampling into an orthogonal coordinate system for classification and recognition of the image pattern in accordance with the present invention.

To help in the comprehension of the present invention, FIGS. 3A and 3B illustrate an example of complex-log mapping by a polar exponential sampling. The circles in FIG. 3A are optical input elements which are arranged in a polar exponential arrangement manner.

In FIG. 3A, the center point of each small circle corresponds to an optical input element, while the small circle corresponds to a sampling region (photosensitive region) where the corresponding optical input element receives light.

In FIG. 3A, two points, $A(x_1,y_1)$ and $B(x_2,y_2)$ can be described in an x-y complex plane as follows:

$$A = \rho_1 \cdot e^{j\theta_1} \quad \rho_1 = (x_1^2 + y_1^2)^{1/2} \quad \theta_1 = \tan^{-1}(y_1/x_1)$$

$$B = \rho_2 \cdot e^{j\theta_2} \quad \rho_2 = (x_2^2 + y_2^2)^{1/2} \quad \theta_2 = \tan^{-1}(y_2/x_2)$$

Then, if the two points, A and B, are mapped onto the u-v plane (orthogonal coordinate system), they can be described as follows:

$$A'=\log(A)=\log(\rho_1)+j(\theta_1+2k\pi)$$

$$B'=\log(B)=\log(\rho_2)+j(\theta_2+2k\pi)$$

They can also be described as follows:

$$A' = u_1 + jV_1 \quad u_1 = \log(\rho_1) \quad V_1 = \theta_1$$

$$B' = u_2 + jV_2 \quad u_2 = \log(\rho_2) \quad V_2 = \theta_2$$

Accordingly, they can be described in an u-v orthogonal coordinate system as shown in FIG. 3B.

In an actual hardware construction, converting a polar exponential coordinate system into an u-v orthogonal coordinate system can be achieved by controlling the output position of the optical input elements. This mapping is proposed in the paper, "Topological Mapping Strategy for 2D Shape Recognition", (1983) by L. Massone, et al.

Figure 3C:
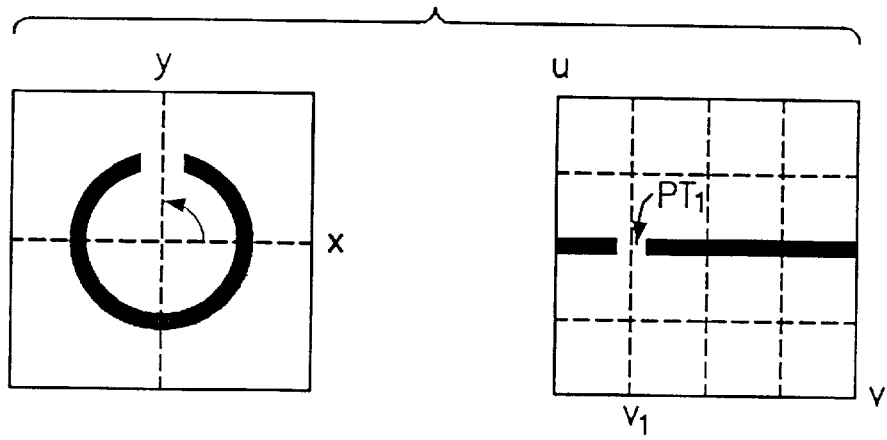
FIGS. 3C to 3E are schematic views showing an example of the result of mapping an image on the x-y orthogonal coordinate system into an u-v orthogonal coordinate system, using the polar exponential sampling.
Figure 3D:
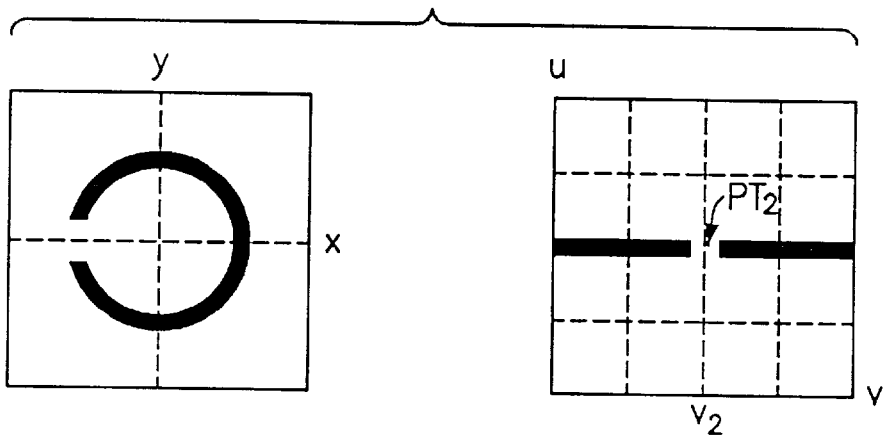
Figure 3E:
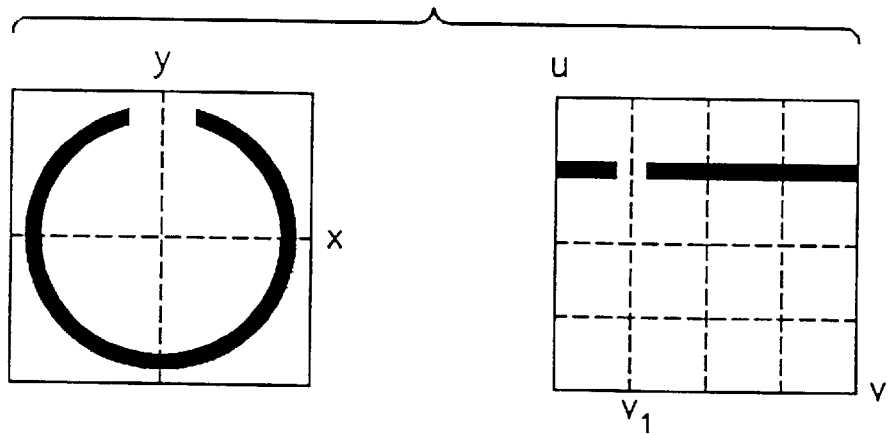

FIGS. 3C to 3E show the features of complex-log mapping. FIG. 3C shows the image pattern when the input image from the optical input elements is mapped into an u-v orthogonal coordinate system. FIG. 3D shows the image pattern in an u-v orthogonal coordinate system when the input image in FIG. 3C is rotated. Furthermore, FIG. 3E shows the image pattern in an u-v orthogonal coordinate system when the input image in FIG. 3C is enlarged.

As shown in FIGS. 3C through 3E, an input image having the same shape is expressed as the same image pattern in the u-v orthogonal coordinate system by complex-log mapping. Particularly, when the scale of the input image is changed as shown FIGS. 3C and 3E, the mapped image pattern has the variation only in the u-axis. Then, the mapped image pattern into the u-v orthogonal coordinate system contributes to increasing the recognition rate because the mapped image pattern is simply translated. On the other hand, when there is a rotation as shown in FIGS. 3C and 3D, the mapped image pattern has the variation only in the v-axis, that is, $PT_1$ and $PT_2$ may be respectively shown in different points, $V_1$ and $V_2$ in v-axis Realization of complex-log mapping is identical to exponential reduction of sampling at input regions. In other words, logarithmical scaling accomplished by sampling a point on the retina (orthogonal coordinate system) and converting it into a corresponding point on the polar coordinates has the same effect as an exponential reduction of sampling from the center. Accordingly, polar exponential sampling is used for practical realization of complex-log mapping. Existing camera units, for example, CCD cameras have difficultly in achieving polar exponential sampling as they are, because they receive external images by photoreceptors orthogonally arranged in a two-dimensional plane. In this regard, the present invention provides photoreceptors arranged in a polar exponential form for achieving polar exponential sampling. In other words, the photoreceptors are distributed on concentric circles arranged between the center of the retina and the peripheral edge of the retina. The concentric circles have exponentially increased radii, respectively. The concentric circles have an equal number of photoreceptors distributed thereon, equiangular positions of photoreceptors, and equiangular distance between adjacent photoreceptors.

In accordance with the present invention, positions of corresponding sampling regions in alternating concentric circles have a phase difference of (2*π/N)/2. Such an arrangement provides the effect of minimizing regions not sampled where the corresponding sampling regions are arranged in equivalent positions, respectively.

Accordingly, where the retina has N equally-divided angles and M equally-divided radii, namely, scales, the number of sampling regions formed is M*N (in the illustrated case, N=16, and M=32). In this case, scale, position and sampling interval (radius of each concentric circle) of each sampling region is defined by the following equations:

$$E_i = E_{min}\left(1 + \frac{\pi}{N * \sqrt{3}}\right)^{i-1}$$

$$P_i = \frac{2 * \pi * E_i}{N * \sqrt{3}}$$

where, $E_i$ represents the distance of the i-th concentric circle (one interval) from the center (sampling interval), $E_{min}$ represents the minimum region of sampling, N represents the number of sampling regions in one interval, and $P_i$ represents the scale (diameter) of each sampling region.

Figure 4A:
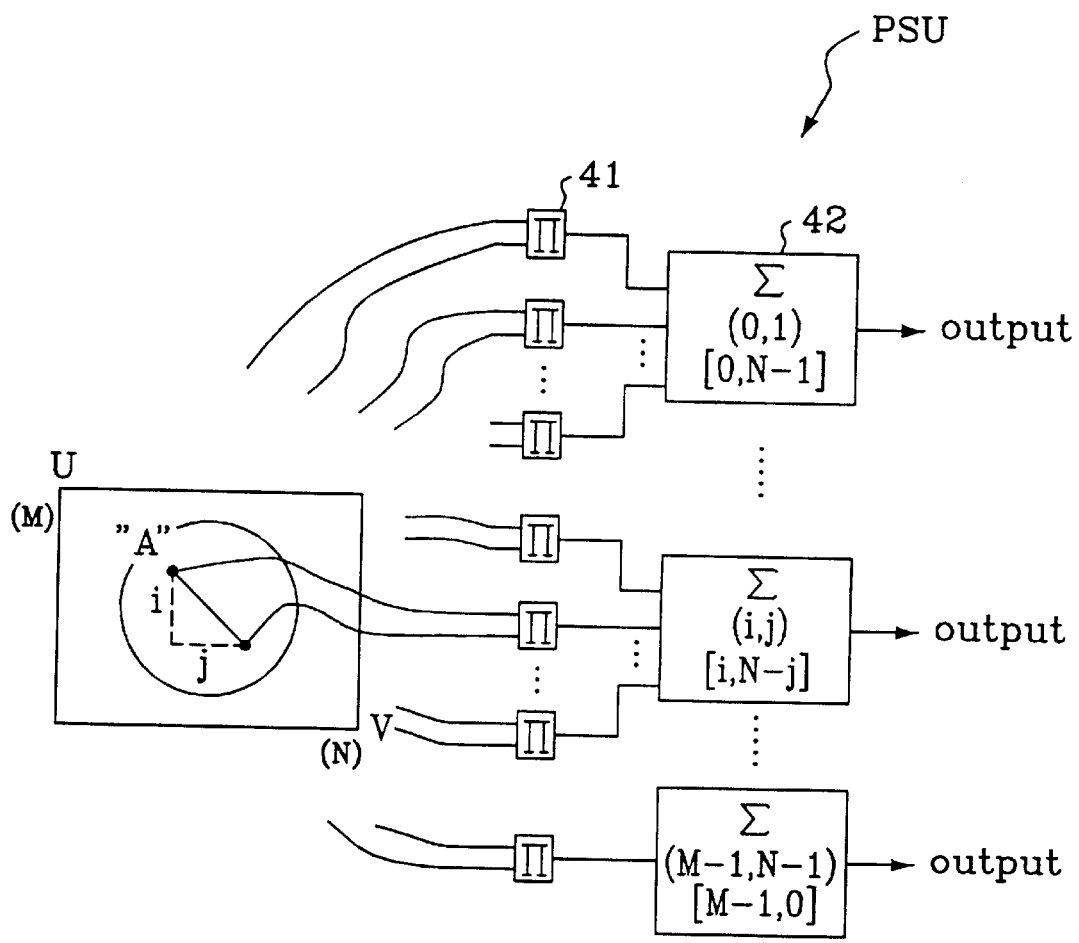
FIG. 4A is a view illustrating the first positional translation invariant feature extraction network unit (hereinafter, referred to as a PSU) using a second-order neural network in accordance with an embodiment of the present invention.

FIG. 4A illustrates an embodiment of extracting the feature of the mapped image pattern in the u-v orthogonal coordinate system, irrespective of the positional translation, that is, FIG. 4A shows the first positional translation invariant feature extraction network unit(PSU) which is an example of the PIU 23 of FIG. 2.

In FIG. 4A, the reference numeral 41 denotes a multiplier, or an AND gate, being adapted to multiply values of two optical input elements, which indicates a mapped image pattern into the u-v orthogonal coordinate system, while the reference numeral 42 denotes an adder.

Also, FIG. 4A is made of a second-order neural network, where an input stage of the multiplier 41 receives the outputs from two optical elements.

The PSU serves to correct a positional translation phenomenon, as shown in FIGS. 3C to 3E occurring due to complex-log mapping. The PSU converts an output of complex-log mapping unit 21 into a positional translation invariant form by use of the second-order neural network.

Referring again to FIG. 4A, the PSU includes a plurality of multipliers 41, each of which has two input stages connected to two input elements in FIG. 3A and serving to respectively multiply values which are received via the two input elements and outputs the resultant value. The multipliers 41 are classified into a plurality of groups. Furthermore, the PSU includes a plurality of adders 42 having a group of input stages which are connected to output stages of each corresponding group of the multipliers 41 and serving to add values received via the input stages and output the resultant value to the classifying and recognizing neural network shown in FIG. 6.

In FIG. 4A, the symbols "( )" and "[ ]", indicated below the symbol "Σ" of each adder 42, designate kinds of multipliers 41 whose outputs are applied to the adder 42, respectively. That is, (i, j) stands for the case wherein two input elements for each multiplier 41 has the positional relation that the height (u-axis) and the width (v-axis) in the downward and right direction corresponds to i and j, respectively. On the other hand, [i, N–j] stands for the case wherein two input elements for each multiplier 41 has width N–j and height i in the downward and left direction. As shown in area "A" of FIG. 4A, the PSU is made by adding all outputs of multipliers 41 having the same positional relations of two input elements that the height and the width in the right and downward direction corresponds to i and j, (i=0,1,2, . . . M–1, j=0,1,2, . . . N–1). As a result, outputs of the adders 42 are spectrums irrespective of positional translation.

Figure 4B:
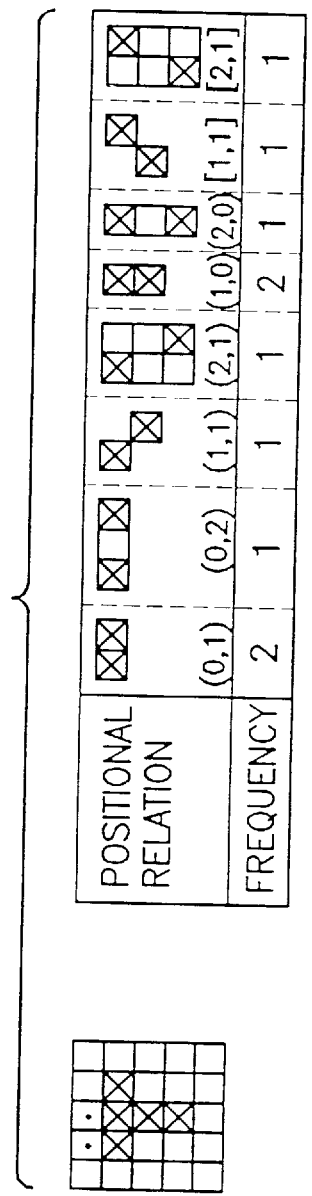
FIGS. 4B and 4C are schematic views illustrating the result of spectrum for a T-shaped input image, using the second-order neural network in FIG. 4A.
Figure 4C:
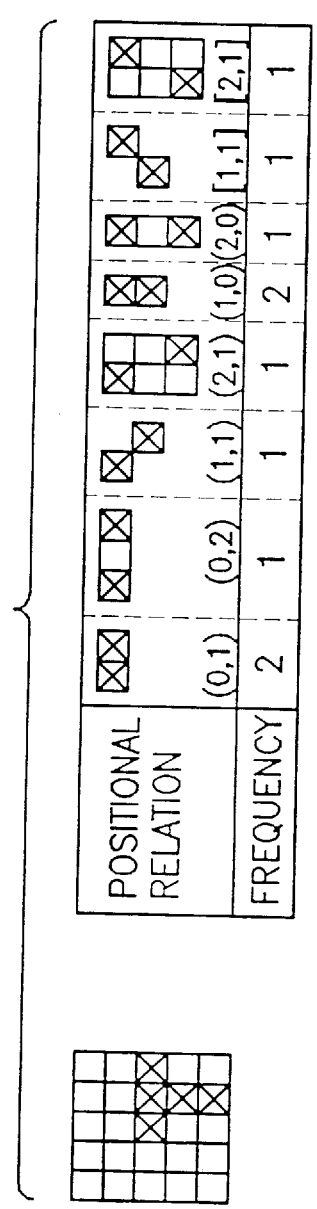

FIGS. 4B and 4C illustrate the processing results of FIG. 4A for a T-shaped image pattern from the optical input elements in accordance with the orthogonal arrangement manner, and shows positional relations and corresponding frequency. The results of FIG. 4A are output as digital values corresponding to the positional relations.

Comparing the T-shaped image pattern of FIG. 4B with that of FIG. 4C, the positional relations and their frequency are all the same. That is to say, the second-order neural network in FIG. 4A outputs the same results, regardless of the positional translation.

Figure 5B:
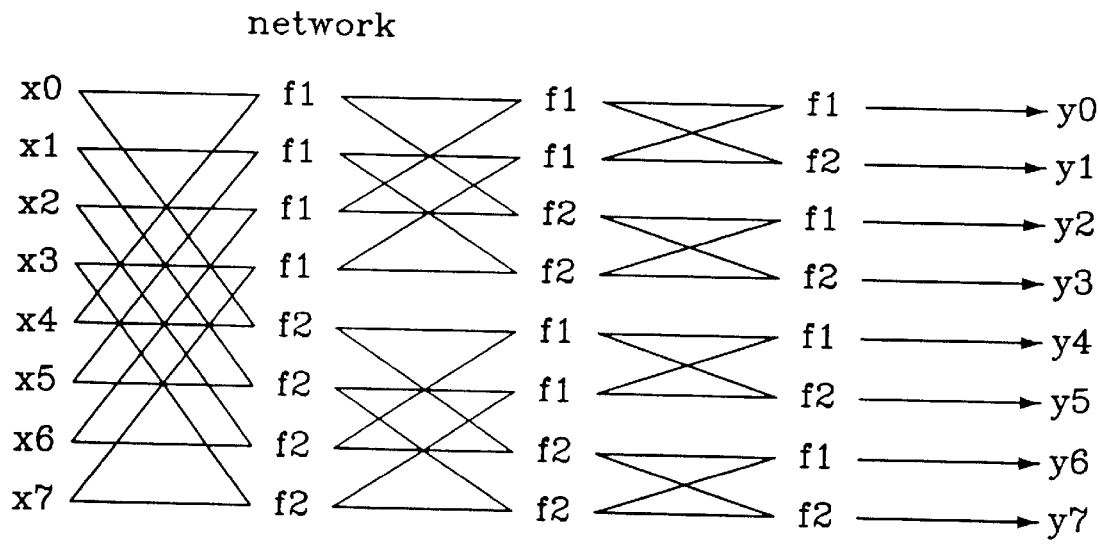
FIG. 5B is a schematic view illustrating one-line positional translation invariant neural networks used in FIG. 5A.

FIG. 5A illustrates another embodiment using the second positional translation invariant feature extraction network unit(TINU) of another example of the PIU 23 in accordance with the present invention. FIG. 5B illustrates vertical networks Vj or horizontal networks Hi used in the case of FIG. 5A. In this case, the TINU is embodied by one-line positional translation invariant neural networks.

In FIG. 5A, each horizontal network Hi receives the i-th row's one of two-dimensional inputs as its input and generates an output invariant to positional translation at the corresponding row via the networks shown in FIG. 5B. Similarly, each vertical network vj receives the j-th column's one of two-dimensional inputs as its input and generates an output invariant to positional translation at the corresponding column via the networks shown in FIG. 5B. "H-TIN" stands for a two-dimensional image region constructed by M horizontal networks (Hi), while "V-TIN" stands for a two-dimensional image region constructed by N vertical networks (Vj). on the other hand, "$Z_{HV}$" stands for the output obtained after the output of the complex-log mapping unit 21 passes through H-TIN and V-TIN. Similary "$_{VH}$" stands for the output obtained after the output of complex-log mapping unit 21 passes through V-TIN and H-TIN. As shown in FIG. 5A, the outputs "$Z_{HV}$" and "$Z_{VH}$" are collected to form a positional translation invariant spectrum.

The example of the one-line positional translation invariant neural network illustrated in FIG. 5B corresponds to the case of 8th-order input dimension with respect to the vertical and horizontal network Vj and Hi which are shown in FIG.

5A. In FIG. 5B, "x0" to "x7" from the u-v plane in FIG. 5A represent inputs, respectively, while "y0" to "y7" represent outputs, respectively. On the other hand, "f1" represents an AND element and "f2" represents an OR element. In this case, the output y has a positional translation invariance with respect to the input x.

The one-line positional translation invariant neural network in FIG. 5B is also made of a second-order neural network which can obtain the same results for other translated inputs. For example, if input "$P_1$" (10011101) in the u-v plane and shift input "$P_2$" (11001110) of "$P_1$" are input, the same output c(00110111) is output. That is to say, if there is any positional translation, the shifted input pattern can be identified as the same form, and the results of FIG. 5A are input to the classifying and recognizing neural network shown in FIG. 6.

FIG. 6 illustrates an example of the classifying and recognizing neural network unit in accordance with the present invention. In FIG. 6, there is illustrated a multilayer perceptron structure for classifying and recognizing the resultant output of the PIU 23. This structure is the well-known multilayer perceptron structure which is already proposed in "Parallel Distributed Processing, Vol 1, MIT Press (1986)" by J. L. McClelland and D. E. Rumelhart.

In FIG. 6, the small circles represent neurons, respectively. Each of the neurons is defined by the following equation:

$$y_i = f\left[\sum_j W_{ij} * x_j\right]$$

Where, W represents the weight, y and x represent the output and the input of the neuron, respectively, f represents the activation function (S-shape function), i represents the output neuron's number, and j represents the input neuron's number.

Figure 7:
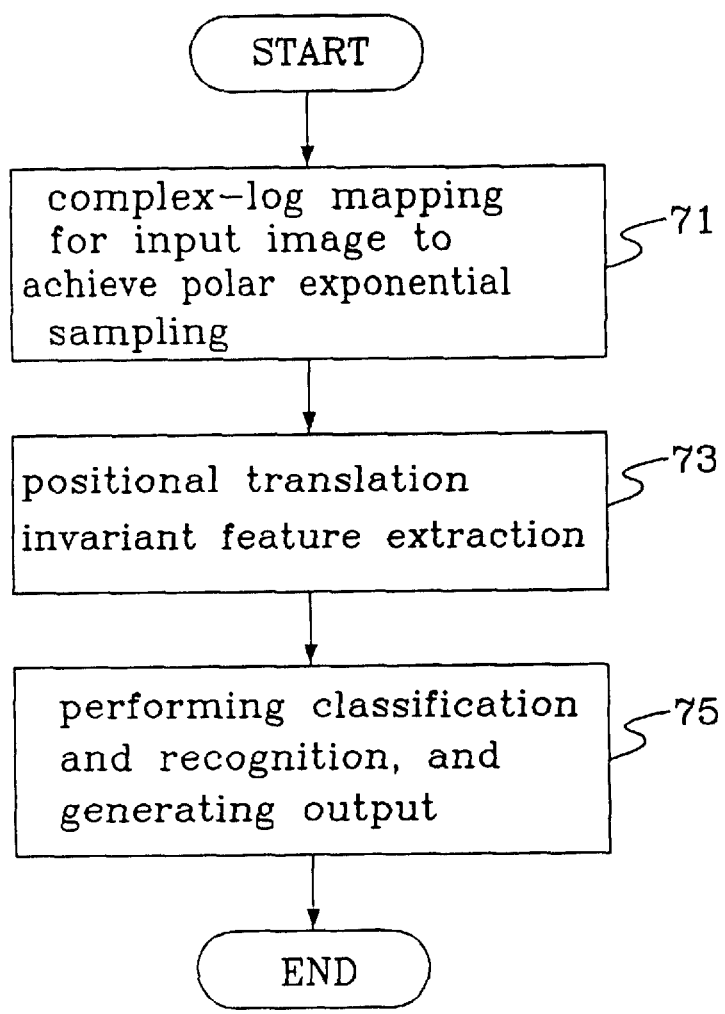
FIG. 7 is a flow chart illustrating a procedure for classifying and recognizing an image pattern in accordance with the present invention.

FIG. 7 is a flow chart schematically illustrating a procedure carried out by the method of classifying and recognizing image patterns in accordance with the present invention. As shown in FIG. 7, the image pattern classifying and recognizing procedure includes the step 71 of performing complex-log mapping for an input image, the step 73 of converting the resultant output generated at the step 71 into a positional translation invariant form by use of a second-order neural network having adders (OR elements) and multipliers (AND elements), so as to correct a positional translation phenomenon resulted from complex-log mapping, and the step 75 of classifying and recognizing the resultant output generated at the step 73 by use of a neural network.

As illustrated above, the scale and/or rotation variation of the input image is compensated for by complex-log mapping unit 21, a positional variation of the output of complex-log mapping unit 21 is compensated for by the positional translation invariant feature extraction network unit 23, and the classifying and recognizing neural network 25 classifies and recognizes the output of it. Then, if the same shaped input image is input, the classifying and recognizing neural network unit 25 outputs the same outputs, irrespective of scale and rotation of the input image.

All the steps in the procedure use network structures. The input image signal is finally converted into the scale and/or rotational invariant form after passing through the networks. Accordingly, it is possible to process image signals in parallel at a high rate. The conversion of an input image into the scale and/or rotation invariant form can be possible only by properly selecting an arrangement of optical input elements and a connection of the optical input elements to neural networks. Accordingly, the conversion into the scale and/or rotation invariant form and the conversion into the positional translation invariant form can be achieved without using any mathematical conversion, such as the Fourier conversion. This enables the recognition of an input image at a high rate irrespective of scale and/or rotation.

In other words, the present invention utilizes the fact that complex-log mapping involves mapping for a pattern of the input image (retina) to a positional translation on an u-v plane when the pattern involves a transform in rotation or scale and that the second-order neural network can be made invariant to positional translation. In accordance with the present invention, these two functions are coupled to construct a rotation and scale invariant recognition system.

As apparent from the above description, the present invention enables high-rate image pattern classification and recognition based on parallelism of processing, which is the advantage obtained in neural network models, because consistent neural networks and consistent network structure computation models are applied to all steps from the image input step to the pattern classifying and recognizing step. The present invention also eliminates the time additionally required for feature extraction by using complex-log mapping realizing the polar exponential sampling. It is also possible to eliminate any additional positional translation correction step and thereby greatly improve the recognition performance, because the second-order neural network solves the positional translation conversion.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for classifying and recognizing an image received from an object, irrespective of scale and/or rotation of the image, the apparatus comprising:

a complex-log mapping means having optical input elements arranged in a polar exponential manner, for mapping the image received from the object into an orthogonal coordinate system, and for providing an output processed in parallel in the orthogonal coordinate system, the output being invariant to the scale and/or rotation of the image a second-order neural network means for multiplying the output of the complex-log mapping means to produce a multiplication output and for adding the multiplication output to produce an output invariant to a positional translation caused by the complex-log mapping means; and a classifying and recognizing neural network means, having a neural network, for classifying and recognizing the output of the second-order neural network means.

2. An apparatus in accordance with claim 1, wherein said complex-log mapping means comprises a plurality of optical input elements arranged in a plurality of concentric circles having exponentially increasing radii, are distributed in a polar exponential form, and have respective sampling regions having a predetermined phase difference arranged in alternating concentric circles; and wherein the concentric circles are arranged from a center of said complex-log mapping means to a peripheral edge of said complex-log mapping means, have an equal number of optical input elements, have equiangular positions of optical input elements, and have an equiangular distance between adjacent optical input elements.

3. An apparatus in accordance with claim 1, wherein the second-order neural network means comprises:

a first layer having a plurality of multipliers, each multiplier multiplying two values in the orthogonal coordinate system corresponding to two optical input elements and producing a multiplication output; and a second layer having a plurality of adders coupled to the first layer, each adder adding multiplication outputs corresponding to two optical input elements spaced apart by a same vertical distance and a same horizontal distance in the orthogonal coordinate system.

4. An apparatus for classifying and recognizing an image received from an object, irrespective of scale and/or rotation of the image, the apparatus comprising:

a complex-log mapping means having optical input elements arranged in a polar exponential manner, for mapping the image received from the object into an orthogonal coordinate system, and for providing an output processed in parallel in the orthogonal coordinate system, the output being invariant to the scale and/or rotation of the image;

a second-order neural network means for ANDing and ORing the output of the complex-log mapping means, to produce an output invariant to a positional translation caused by the complex-log mapping means; and a classifying and recognizing neural network means, having a neural network, for classifying and recognizing the output of the second-order neural network means.

5. An apparatus in accordance with claim 4, wherein said complex-log mapping means comprises a plurality of optical input elements arranged in a plurality of concentric circles having exponentially increasing radii, are distributed in a polar exponential form, and have respective sampling regions having a predetermined phase difference arranged in alternating concentric circles; and wherein the concentric circles are arranged from a center of said complex-log mapping means to a peripheral edge of said complex-log mapping means, have an equal number of optical input elements, have equiangular positions of optical input elements, and have an equiangular distance between adjacent optical input elements.

6. An apparatus in accordance with claim 4, wherein said second-order neural network means comprises:

a horizontal second-order neural network means for ANDing and ORing the output of the complex-log mapping means in the horizontal direction of the orthogonal coordinate system to produce an output; and a vertical second-order neural network means for ANDing and ORing the output of the complex-log mapping means in the vertical direction of the orthogonal coordinate system to produce an output.

7. An apparatus in accordance with claim 4, wherein the second-order neural network means comprises:

a first layer having a plurality of elements, each element ANDing or ORing two values in the orthogonal coordinate system corresponding to two optical input elements and producing a first layer output; and a second layer having a plurality of elements coupled to the first layer, each element ANDing or ORing two first layer outputs and producing a second layer output.

8. A method for classifying and recognizing an image received from an object through optical input elements disposed in a polar exponential arrangement, irrespective of scale and/or rotation of the image, the method comprising the steps of:

(a) mapping the image from the optical input elements to an orthogonal coordinate system to obtain an output irrespective of scale and/or rotation of the image;

(b) multiplying values of the output from step (a) to obtain multiplication outputs;

(c) adding the multiplication outputs from step (b) to obtain outputs irrespective of a position variation of the image; and (d) classifying and recognizing outputs from step (c).

9. A method in accordance with claim 8, wherein the step of multiplying in step (b) comprises multiplying two values of the output from step (a) in the orthogonal coordinate system corresponding to two optical input elements and producing a multiplication output; and wherein the step of adding in step (c) comprises adding multiplication outputs from step (b) corresponding to two optical input elements spaced apart by a same vertical distance and a same horizontal distance in the orthogonal coordinate system.

10. A method for classifying and recognizing an image received from an object through optical input elements disposed in a polar exponential arrangement, irrespective of scale and/or rotation of the image, the method comprising the steps of:

(a) mapping the image from the optical input elements to an orthogonal coordinate system to obtain an output irrespective of scale and/or rotation of the image;

(b) horizontally and/or vertically ANDing and ORing values of the output from step (a) using a second-order neural network to produce an output from the output from step (a), irrespective of the position of the image; and (c) classifying and recognizing the output from step (b).

11. A method in accordance with claim 10, wherein step (b) comprises:

processing the output from step (a) using a first layer of elements, each element of the first layer ANDing or ORing two values in the orthogonal coordinate system corresponding to two optical input elements and producing a first layer output; and processing the first layer outputs using a second layer of elements, each element of the second layer ANDing or ORing two first layer outputs and producing a second layer output.

* * * * *